United States Patent [19]

Arndt et al.

[11] Patent Number: 5,596,150
[45] Date of Patent: Jan. 21, 1997

[54] CAPACITANCE PROBE FOR FLUID FLOW AND VOLUME MEASUREMENTS

[75] Inventors: G. Dickey Arndt, Friendswood; Thanh X. Nguyen; James R. Carl, both of Houston, all of Tex.

[73] Assignee: The United States of America as represented by the Administrator of the National Aeronautics and Space Administration, Washington, D.C.

[21] Appl. No.: 400,703

[22] Filed: Mar. 8, 1995

[51] Int. Cl.⁶ ........................................... G01F 1/58
[52] U.S. Cl. ........................ 73/861.12; 128/691
[58] Field of Search ............ 73/861.11, 861.12, 73/861.13, 861.14, 861.15, 861.08, 861.66, 861.65; 128/691, 632, 713; 604/31, 65, 67; 324/663, 448, 672

[56] References Cited

U.S. PATENT DOCUMENTS

| | | | |
|---|---|---|---|
| 3,329,974 | 7/1967 | Belasco et al. | 4/142 |
| 3,340,544 | 9/1967 | Cella | 4/10 |
| 3,405,409 | 10/1968 | Bennett | 4/142 |
| 3,807,231 | 4/1974 | Spaw | 73/290 R |
| 3,820,392 | 6/1974 | Beck et al. | 73/861.08 |
| 3,935,970 | 2/1976 | Spaw | 222/56 |
| 4,169,543 | 10/1979 | Hail | 222/56 |
| 4,222,267 | 9/1980 | Aldrich | 73/304 C |
| 4,226,118 | 10/1980 | Aldrich | 73/290 V |
| 4,343,316 | 8/1982 | Jespersen | 128/771 |
| 4,402,230 | 9/1983 | Raptis | 73/861.04 |
| 4,448,207 | 5/1984 | Parrish | 128/771 |
| 4,459,858 | 7/1984 | Marsh | 73/861.12 |
| 4,503,383 | 3/1985 | Agar | 324/61 P |
| 4,532,936 | 8/1985 | LeVeen et al. | 128/762 |
| 4,554,828 | 11/1985 | Doll | 73/202 |
| 4,589,281 | 5/1986 | Aldrich | 73/290 R |
| 4,631,969 | 12/1986 | Schmoock | 73/861.12 |
| 4,659,218 | 4/1987 | de Lasa et al. | 356/133 |
| 4,864,462 | 9/1989 | Madou et al. | 361/280 |
| 4,891,993 | 1/1990 | Barker | 73/863.52 |
| 4,947,128 | 8/1990 | Hatton et al. | 324/640 |
| 4,947,129 | 8/1990 | Helms et al. | 324/640 |
| 4,977,915 | 12/1990 | Marrell | 137/4 |
| 5,005,457 | 4/1991 | Thornton, Jr. et al. | 83/206 |
| 5,048,335 | 9/1991 | Marsh et al. | 73/304 C |
| 5,068,617 | 11/1991 | Reich | 324/663 |
| 5,099,697 | 3/1992 | Agar | 73/861.04 |
| 5,101,163 | 3/1992 | Agar | 324/639 |
| 5,101,367 | 3/1992 | Agar | 364/551.01 |
| 5,140,270 | 8/1992 | Martin et al. | |
| 5,176,326 | 1/1993 | Blackmon et al. | 239/459 |
| 5,263,363 | 11/1993 | Agar | 73/61.44 |
| 5,265,482 | 11/1993 | Davis et al. | 73/863.01 |
| 5,270,663 | 12/1993 | Sano et al. | 324/663 |
| 5,426,373 | 6/1995 | Diamond et al. | 324/663 |
| 5,503,027 | 4/1996 | Hemp | 73/861.11 |

OTHER PUBLICATIONS

Paper entitled "Electromagmetic Probe Technique for Fluid Flow Measurements", J. R. Carl & G. D. Arndt.

*Primary Examiner*—Richard Chilcot
*Assistant Examiner*—Jewel Artis
*Attorney, Agent, or Firm*—Hardie R. Barr

[57] ABSTRACT

Method and apparatus for making measurements on fluids are disclosed, including the use of a capacitive probe for measuring the flow volume of a material within a flow stream. The capacitance probe has at least two elongate electrodes and, in a specific embodiment of the invention, has three parallel elongate electrodes with the center electrode being an extension of the center conductor of a co-axial cable. A conductance probe is also provided to provide more accurate flow volume data in response to conductivity of the material within the flow stream. A preferred embodiment of the present invention provides for a gas flow stream through a micro-gravity environment that allows for monitoring a flow volume of a fluid sample, such as a urine sample, that is entrained within the gas flow stream.

13 Claims, 4 Drawing Sheets

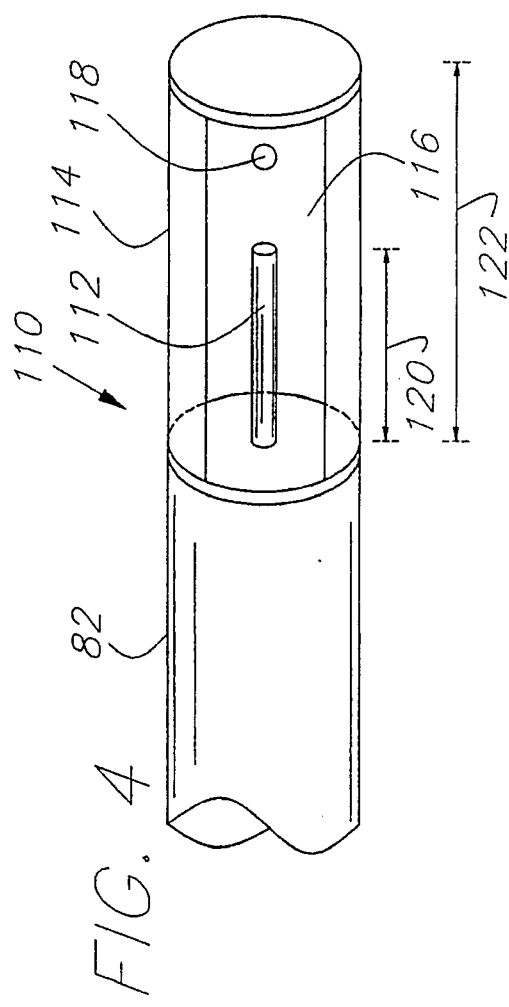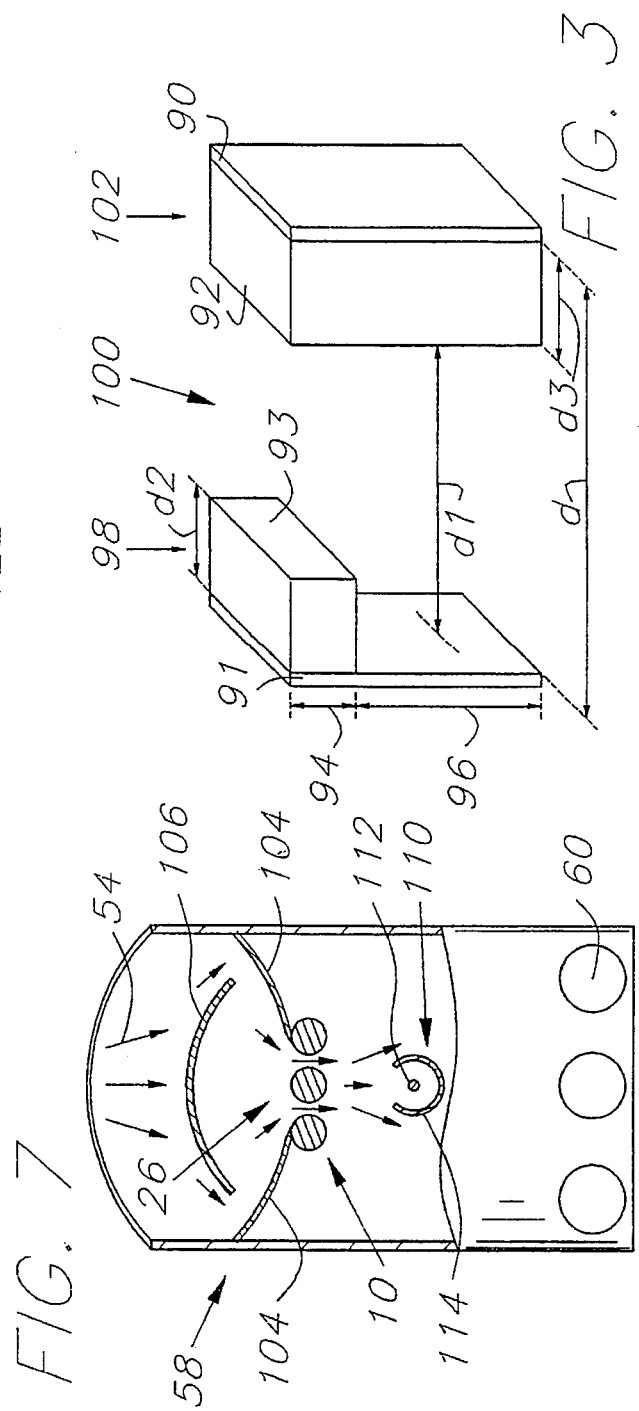

CAPACITANCE PROBE FOR FLUID FLOW AND VOLUME MEASUREMENTS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457.

BACKGROUND OF THE INVENTION

1. Field of the Invention

The present invention pertains to methods and apparatus employing an electromagnetic probe operable for monitoring flow volumes such as the flow volume of an individual phase within a multi-phase mixture that may include a gas as one phase. A particular embodiment of the present invention is especially suitable to life science instrumentation and techniques to provide an electronic flow volume monitor to measure and record urinary output volume for use in a micro-gravity environment, where liquid volume measurements are typically more difficult to make.

2. Description of Prior Art

Generally, the features of the present invention are applicable to usage in percentage flow volume measurements such as for (1) determining the amount of a material in solution such as salt in water, (2) distinguishing and/or monitoring fluid mixtures of fluids having relative permeabilities that are very close such as two alcohols or two oils, (3) determining volume fractions of substantially immiscible fluids such as of oil and water in a flowline, (4) detecting impurities in water, (5) monitoring condensed fluid content within an air stream, and the like.

The present invention is also uniquely suited to the life science problem of measurement of urinary output volume in a micro-gravity environment. Space voyages, especially long term space voyages, in diminished gravity or weightlessness conditions are often detrimental to the health of human space travelers. The relative ease that the heart experiences by pumping blood in a weightless environment produces a cardiovascular de-conditioning effect. Also, without a gravitational force, body fluids tend to migrate upwards in the body to create congested areas.

Therefore, obtaining accurate and consistent measurement of fluid intake and outflow is important for monitoring the health and condition of persons involved in spacecraft missions. Acute changes in urine flow can be the earliest evidence of change in a person's health related to renal blood flow and may occur even before changes in the vital signs of blood pressure, temperature, pulse, or respiration.

The urinary output volume measurement system presently in use on the Space Shuttle utilizes a centrifuge phase separator to allow the taking of volume measurements in a micro-gravity environment. A pressure sensor at the perimeter of the centrifuge phase separator housing measures the force produced when the liquid therein, that is collected and dumped by means of a valve mechanism, is rotated by a drive motor at a constant 400 rpm. The pressure reading from the pressure sensor is related to the volume of the liquid. The centrifuge phase separator requires several minutes to provide a measurement, it adds about 20 kilograms of weight to the flight load, and it absorbs approximately 140 watts of power during operation. Thus, it is desirable to have a substantially non-mechanical measurement device that is lighter, smaller, more accurate and requires less power and time to complete a measurement cycle.

Numerous patents relate to the measurement of medically significant fluids. Urinary output may be measured for many purposes and is related to urinary tract health, blood pressure, heart condition, sodium intake, renal obstruction or failure, and changes in the perfusion of major organs such as the kidney.

U.S. Pat. No. 4,532,936 to LeVeen et at. discloses an apparatus that measures urinary output optically, totalizes the measurement, and prints it on a self-adherent paper which can easily be affixed to a hospital chart. The apparatus includes a measurement column, an optical sensor to determine when the measurement column is empty, a peristaltic pump to empty the measurement column at a known rate, and control logic to determine the volume removed from the column based on the pump rate. A display is also provided for easy observation of current output statistics.

U.S. Pat. No. 4,343,316 to C. A. Jespersen discloses a urine flow monitor for digitally displaying total patient urinary output and flow rate. Urine from the patient passes through a catheter and into a calibrated volume chamber having electronically controlled valves located both above and below the chamber. With the lower valve closed, filling of the chamber takes place until the point where the level reaches an optical sensor at which time the upper valve closes and the lower valve opens to dump the contents. A signal is sent to a console monitor to record the volume dumped and to commence operation.

U.S. Pat. No. 4,891,993 to K. R. Barker discloses an apparatus and method for measurement of urinary output volume. The invention provides a device for establishing a stream of uniform flow from the urinary output. The beginning and ending times of the uniform flow is established by changes in resistivity monitored with electrodes. Because a uniform flow is provided, timing of the duration of the stream provides a measurement of urinary output volume.

U.S. Pat. No. 4,448,207 to J. H. Parrish discloses a urinary output measuring system that includes a gimbal mounted frame that supports a urine container of fixed dimensions to thereby collect urine from a urinary catheter attached to a patient. An ultrasonic transceiver mounted above the container and operated in conjunction with a microprocessor based control unit, periodically measures the height of urine collected in the container. The measured fluid height is used to calculate fluid volume by the control unit. To maintain sterility of the container, the ultrasonic transceiver is mechanically isolated by elements that allow the ultrasonic energy to be transmitted into and received from the interior of the container.

U.S. Pat. No. 5,265,482 to Davis et al. discloses a container that is scanned bottom-to-top and top-to-bottom with a capacitive sensor to detect liquid interfaces therein. The interfaces are coded, their relative heights are stored, and the codes are compared to determine whether the measurements are internally consistent. If the measurements are consistent, then the code and height information is used to sample a desired layer. The system may be used to withdraw a particular layer from a separable fluid such as blood that, after separation, may include red blood cells at a lower position in the container, a separation gel above the red blood cells, plasma above the separation gel and air on the top.

Various patents relate to micro-gravity waste elimination systems including U.S. Pat. No. 3,405,409 to F. M. Bennett, U.S. Pat. No. 3,329,974 to N. Belasco et al., U.S. Pat. No. 3,340,544 to R. T. Cella, and U.S. Pat. No. 5,005,457.

U.S. Pat. No. 5,176,326 to Blackmon et at. discloses a fluid ejection nozzle which facilitates a wide distribution of fluid therefrom and which permits the fluid flow rate to be easily adjustable. The nozzle is particularly adapted to a heat rejection system useful in a space environment. The nozzle includes a flow distributor positioned within an orifice of the nozzle housing which is comprised of a tongue member and an attached flow control block.

U.S. Pat. No. 5,101,163 to J. Agar discloses a device for measuring the concentration of two substances through the transmission of electromagnetic waves. The device utilizes at least one transmission element for transmitting a signal and at least two receiving elements for receiving signals from the at least one transmission element for measurement purposes.

U.S. Pat. No. 5,099,697 to J. Agar discloses a device for measuring multiphase fluid flow having a flow restrictor, first and second flow meters, and first and second pressure measurement means. No disclosure of electromagnetic wave measurements is made.

U.S. Pat. No. 5,101,367 and U.S. Pat. No. 5,263,363 to J. Agar discloses a method and apparatus for measuring the percentages of oil and water present in an oil/water mixture that requires measurement of energy absorption properties as well as flow data from a flow meter to determine which of various data curves to select so as to obtain an appropriate oil/water mixture reading. The preferred flow meter is a positive displacement flow meter and therefore necessarily mechanical in operation. U.S. Pat. No. 4,503,383 to Agar et al. discloses a device for detecting an interface between two fluids of differing electrical properties using a probe that requires an air core therein.

A paper entitled "Electromagnetic Probe Technique For Fluid Flow Measurements" by J. R. Carl and G. D. Arndt, who are listed as inventors of the present invention, describes an exemplary system that utilizes microwave techniques for measurements made on fluids. However, the system and antenna have other design constraints. For instance, the antenna does not include an orifice through which all fluids preferably flow. As well, the system does not include a separate conductance probe.

A microwave watercut monitor is disclosed in related patents including U.S. Pat. No. 4,947,128 to Hatton et al., U.S. Pat. No. 4,947,129 to Helms et al., and U.S. Pat. No. 4,977,915 to Marrelli. The co-variance microwave watercut monitor requires a test cell suitably constructed to include antenna wave guides and a flow path adapted to receive the flowway of a petroleum stream. A detector assembly connected to the circulator detects the intensity of the test microwave energy. The watercut is indicated in accordance with the intensity signal and the phase difference between the source provided microwave energy and the test microwave energy.

A monitoring system and method for detecting the presence or absence of a material at a location by utilizing an antenna and a control unit is disclosed in related patents including U.S. Pat. No. 4,589,281, U.S. Pat. No. 4,226,118, U.S. Pat. No. 4,169,543; and U.S. Pat. No. 4,222,267 to J. L. Adrich. The antenna provides a signal if material affecting the impedance of the antenna is in the sensing area.

U.S. Pat. No. 3,807,231 and U.S. Pat. No. 3,935,970 to R. L. Spaw disclose automatic level control systems using a single length of insulated, stranded steel cable as a radiating antenna whose reactance varies as a function of the level of material in the container adjacent the antenna.

Several patents are concerned with determining fluid flow rates. U.S. Pat. No. 4,402,230 to A. C. Raptis is directed to measurement of flow velocities of individual phases of multi-phase flow, using two probes located at different positions separated along the flow. Matched filter techniques are employed to identify the spectral signals of the individual phases, and the output signals are cross-correlated to determine the transit delay for each phase between the probes, which may be either optical, thermal or acoustical types. U.S. Pat. No. 4,459,858 to L. B. Marsh discloses an intrusive probe for use in measuring the velocity of a flowing fluid. The probe includes an electromagnet for generating an electromagnetic field in the moving fluid, and a plurality of electrodes for producing electrical signals in response to the flow of fluid through the electromagnetic field.

U.S. Pat. No. 4,554,828 to F. Doll discloses another intrusive probe including a coil for generating a magnetic field through which flows the fluid whose flow rate is to be measured. Electrodes provide a mechanism for obtaining a voltage that is proportional to the fluid flow rate. The probe is immersed in the moving fluid, and flowing fluid passes through a channel through the probe.

U.S. Pat. No. 4,659,218 to de Lasa et al. discloses fiber optic probes for sensing light intensity in monitoring characteristics of bubbles in two and three phase systems.

A level detector is disclosed in U.S. Pat. No. 5,048,335 to Marsh et at. A resonant circuit includes a capacitance probe disposed in a vessel so as to be responsive to variations in capacitance as a function of the level of material in the vessel. An oscillator is coupled to the resonant circuit and to a phase detector for detecting variations in phase angle as a function of the capacitance of the probe. The output of the phase detector is used to obtain an indication of the level of material.

U.S. Pat. No. 5,140,270 to Martin et at. discloses an apparatus for determining the quality of the dielectric material in a transformer bushing. The device uses the bushing as a capacitive element to determine the interior condition of the bushing.

Consequently, there remains a need for lightweight, accurate, low power instrumentation and techniques to make flow volume measurements of an individual phase in a multi-phase flow. Those skilled in the art have long sought and will appreciate that the present invention provides solutions to these and other problems.

SUMMARY OF THE INVENTION

The present invention provides method and apparatus for making measurements on a fluid flow stream which may include multi-phase flow that may have a gas as one phase. In a specific embodiment of the present invention, measurement is made of a volume of urine entrained within an air stream. In this manner, the present invention is especially adapted for measurement of urinary output in a microgravity environment.

More generally, an electromagnetic flow monitor is provided for monitoring flow of a material within a flow stream. The flow monitor includes a first probe having first and second elongate electrodes substantially parallel with respect to each other. The spacing between the electrodes is functionally related to the fluid to be monitored. Generally, the spacing between the electrodes should be small enough that both electrodes will engage the fluid. More specifically, the spacing will typically be related to the size of a droplet of the fluid which size may depend on the fluid, the flow speed, the temperature, the flow stream within which it is entrained, and other related factors. A signal generator is operative to produce a reference signal for the probe. A cable is utilized for applying the reference signal to the probe and conducting a reflection signal to detection circuitry that is responsive to the permittivity of the flow stream between the first and second elongate electrodes by producing an analog permittivity signal. A second probe is also preferably provided to measure conductivity. The detection circuitry is responsive to the conductivity of the material for producing an analog conductivity signal.

Analog to digital conversion circuitry converts the analog permittivity signal and the analog conductivity signal, respectively, to a digital permittivity signal and a digital conductivity signal. Calculating circuitry combines the digital permittivity signal and the digital conductivity signal to provide an output related to flow of the material within the flow stream. For instance, the flow volume of a material may be determined.

In operation, the first probe is provided with at least two elongate electrodes substantially parallel with respect to each other to define an aperture. All flow of the material within the flow stream is directed through the aperture. Factors relating to the rate of flow of the flow stream are determined by measuring or by controlling the flow stream. A spacing is provided between the two elongate electrodes functionally related to the size of a droplet of the material to be monitored within the flow stream. A radio reference signal is applied to the at least two electrodes. A reflected signal is received from the at least two elongate electrodes of the first probe that is indicative of a permittivity of the flow stream the flow rate of material between the electrodes.

It would be advantageous and desirable to provide a reliable and accurate technique for detecting the presence of fluid in a combination of multiple fluids, or of detecting the presence of different states of the same fluid, or a combination of such procedures, and for monitoring the behavior of a fluid or such combinations of fluid or states of the same fluid, and it is an object of the present invention to do so.

It is a further object of the present invention to provide a technique that is capable of measuring the flow volume of the material under test within a multi-phase flow.

It is another object of the present invention to provide a technique whereby conductivity measurements may be made used with permittivity data to provide more accurate flow data.

It is also an object of the present invention to be able to obtain measurements of fluid flow volume in a micro-gravity environment.

It is another object of the present invention to provide a mechanism for distinguishing between materials having small differences in the real part of their complex permittivity or relative dielectric constant.

It is yet another object to provide a substantially linear response for a permittivity probe with respect to the percentage of a first fluid contained within a multi-phase flow stream.

These and other objects, features, and advantages of the present invention will become apparent from the drawings, the descriptions given herein, and the appended claims.

BRIEF DESCRIPTION OF THE DRAWINGS

FIG. 1A is an enlarged elevational view, in cross-section, along line 1A—1A of FIG. 1;

FIG. 3 is a schematic representation of a parallel plate capacitor filled with various dielectric materials;

FIG. 4 is an enlarged top perspective view of a conductivity probe in accord with the present invention;

FIG. 7 is an elevational view, partially in cross-section, of a probe housing in accord with the present invention.

While the invention will be described in connection with the presently preferred embodiment, it will be understood that it is not intended to limit the invention to this embodiment. On the contrary, it is intended to cover all alternatives, modifications, and equivalents as may be included in the spirit of the invention or as defined in the appended claims.

DESCRIPTION OF PREFERRED EMBODIMENTS

The present invention detects the presence of a material flowing through an orifice between the electrodes of a capacitance probe built in accord with the present invention. The load impedance seen by the probe is determined by the permittivity of the material present between the electrodes, and affects the reflection energy from the probe. The percentage of a fluid present in a flow stream can typically be identified by measuring the permittivity variations of the flow stream through the electrodes. With knowledge of the rate of flow of the flow stream, the present invention can determine the flow volume of the individual fluid. As used herein, the word "fluid" refers to liquids, vapors and gases.

Figure 1:
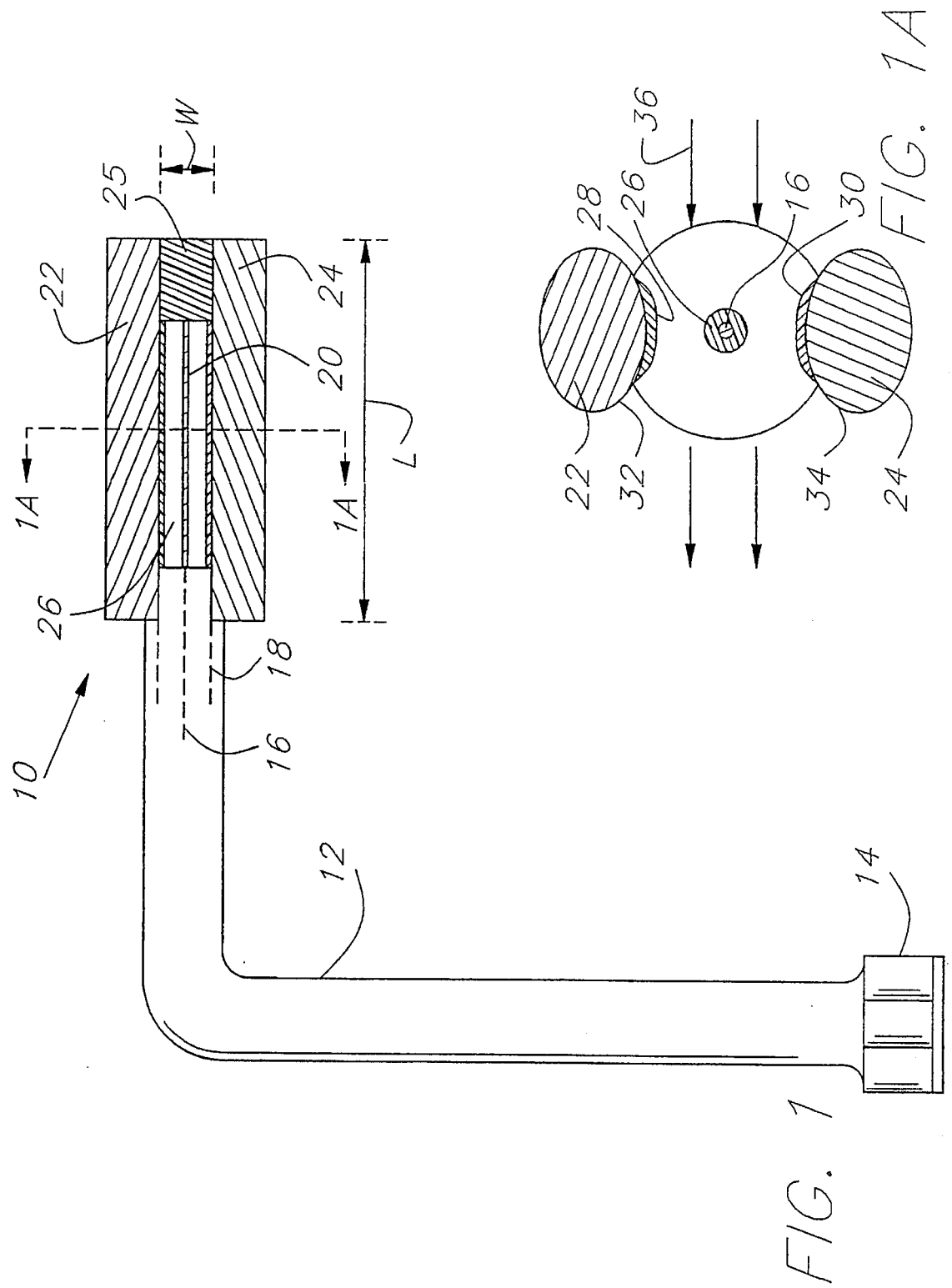
FIG. 1 is an elevational view, partially in section, of a capacitance probe in accord with the present invention.

A capacitance probe according to the present invention is shown generally at 10 in FIG. 1, mounted on the end of a co-axial cable 12. Co-axial cable 12 has a co-axial connector 14 on the opposite end thereof. In a preferred embodiment, coaxial cable 12 may include a one-eighth inch co-axial cable and may be of any necessary length so long as losses preferably do not exceed one or two db. Co-axial cable 12 has a center conductor 16 and an outer shield 18.

Capacitance probe 10 includes an electrical extension of center conductor 16 to form center electrode 20. Center electrode 20 may actually be the center conductor of a co-axial cable, such as center conductor 16 of co-axial cable 12, or may be formed of a metallic rod or plate electrically connected therewith. Outer metallic supports 22 and 24 are electrically connected to, or may be at least partially formed from, outer shield 18. Outer metallic supports 22 and 24 act as outer electrodes and preferably provide a ground plane for capacitance probe 10. However, capacitance probe 10 requires only one outer electrode to co-operate with center electrode 20. Use of two outer metallic supports doubles the flow through probe 10 as discussed hereinafter. Outer metallic supports 22 and 24 also provide a rigid, sturdy, probe structure as is desired to maintain probe measurement consistency. Potting material 25 is utilized to increase the sturdiness of capacitance probe 10 by supporting center electrode 20 and outer metallic supports 22 and 24 in a fixed position. A suitable material for potting material 25 may be substantially composed of the material sold under the registered trademark "Teflon", for example.

In the presently preferred embodiment of the invention, that is specifically adapted to monitor urine flow, or other fluid, entrained in an air stream as discussed hereinafter, length L of capacitance probe 10 is about 1 inch long and generally defines the active region of the probe. The distance between center conductor 16 and each outer metallic support is about 1/16 inch so that width W between outer metallic supports 22 and 24 is about 1/8 inch. Outer metallic supports 22 and 24 define a flow orifice 26 therebetween through which the entire flow stream containing the fluid of interest is preferably directed. In the present embodiment of the invention for a urinary output monitor, this flow stream would include air or gas mixed with a urine sample with the monitor output to be in terms of the volume of the urine sample. The length of probe 10 can be made longer to accommodate larger flow rates for other applications as discussed further in connection with the embodiments of the present invention shown in FIGS. 5 and 6 wherein the length of the probe has been substantially increased.

FIG. 1A discloses an enlarged cross-section of capacitance probe 10, not necessarily to scale, that shows additional features thereof. Preferably center conductor 16 and outer metallic supports 22 and 24 are coated by respective coatings 26, 28, and 30 of a hydrophobic material that repels fluids containing water. In this manner, fluid is less likely to remain within probe 10 after the flow of the fluid to be sampled is completed, where it may be counted as additional flow. For the same purpose of avoiding moisture retention, outer metallic supports 22 and 24 may have rounded outer surfaces 32 and 34. A suitable hydrophobic material for coatings 26, 28, and 30 may be substantially composed of the material sold under the registered trademark "Teflon", for example. Suitable software may also be used in accordance with the system to filter out the effects of residual fluid that remains between the plates of capacitance probe 10 after the flow stream of the sample is effectively completed. Arrows 36 may represent a flow stream that is directed through capacitance probe 10 such as an air stream mixed with a urine sample, or other fluid sample, for which it is desirable to determine the flow volume.

Figure 2:
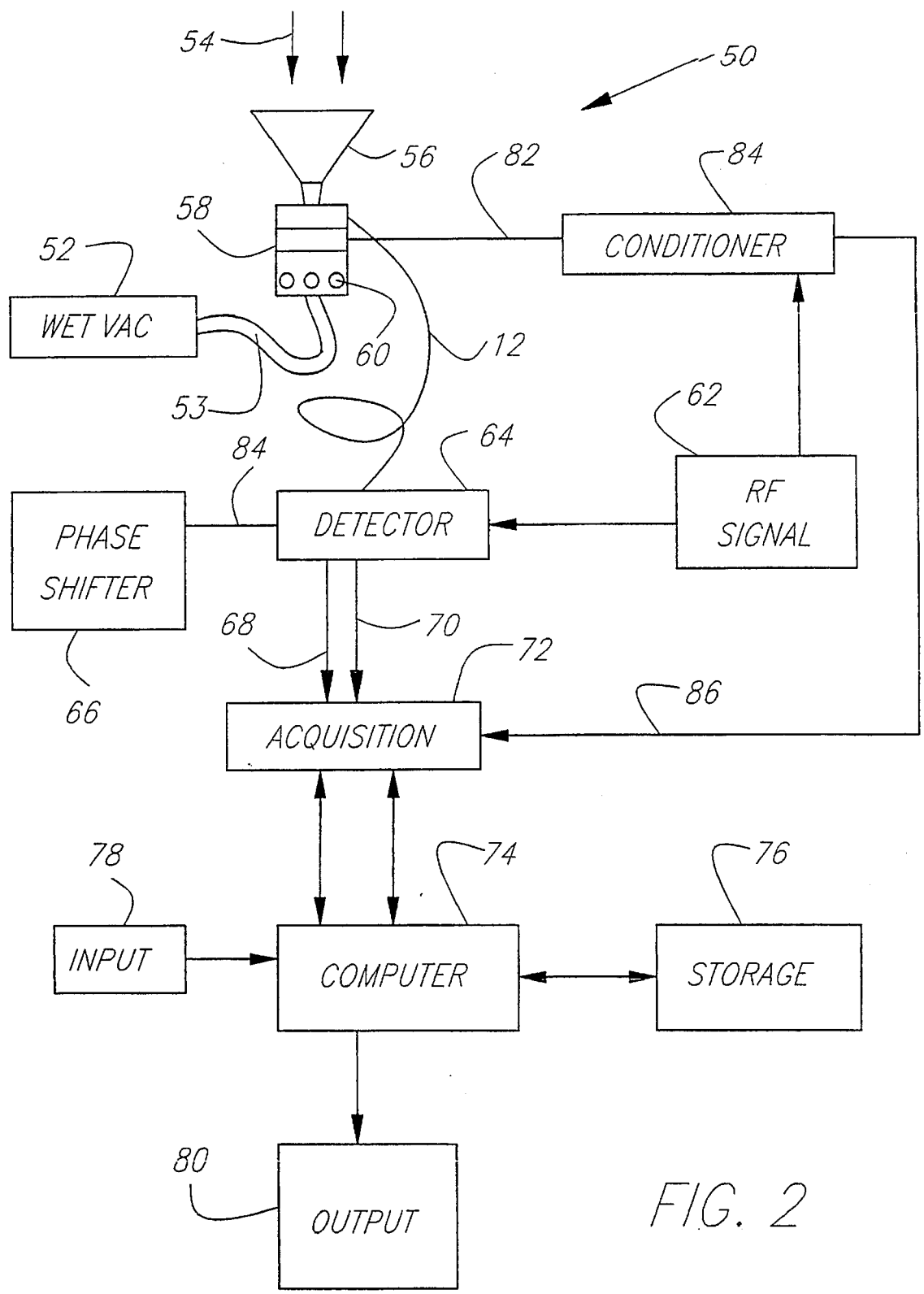
FIG. 2 is a schematic representation of a fluid flow volume measurement system in accord with the present invention.

A fluid flow volume measurement system 50, in accord with a presently preferred embodiment of the invention, is shown in FIG. 2. This system is designed to measure urine flow in a micro-gravity environment. It may also be used to measure other condensed fluids within an air or gas flow. Wet vacuum 52 is used both as a collection device and as a means to produce an flow stream 54 to pull fluid, such as urine, through fluid collector 56 which may be a plastic funnel or other suitable fluid collector. Thus, the urine is entrained within a gas or air flow stream and directed through aperture 26 of capacitance probe 10, as discussed hereinbefore, that is secured in probe housing 58 at the base of fluid collector 56. The vacuum produced by wet vacuum 52, that connects with vacuum hose 53 to probe housing 58, also acts to clear capacitance probe 10 of all fluid quickly after passage of the fluid sample thereby to avoid the problem of fluid remaining on the probe that could be counted as additional flow, as discussed hereinbefore. Flow control air holes 60 are sized to provide the desired velocity of flow stream 54 through capacitance probe 10. The flow stream should not have too great a velocity, for reasons discussed hereinafter, but the vacuum should be sufficient to ensure a substantially consistent flow stream 54 through capacitance probe 10 for consistent measurement results.

RF signal generator 62 produces a reference signal that is applied to capacitance probe 10 in probe housing 58 through cable 12. A reflected signal is produced at probe 10 and reflected to detector 64 which preferably measures the phase difference between the reference signal and the reflected signal. Shifter 66 may be used as desired to alter the phase of the reference signal to thereby improve the sensitivity of the phase difference measurement. Preferably, two analog phase difference signals 68 and 70, in quadrature with respect to each other, are produced in detector 64 and applied to acquisition circuit 72 where they are converted to digital signals and transferred to computer 74 at high sampling rates. The sample rates in system 50 are preferably more than about 500 to 1000 samples per second. However, depending on the application it may be desirable to have much higher sampling rates from 2000 to 100,000 or more samples per second. The information may be stored in storage medium 76. Software and other information may be input to computer 74 through various input devices 78. Charts and displays or other information may be provided on output means 80 that may include monitors, printers, plotters, and the like.

System 50 also includes a conductivity probe mounted within sensor housing 58 and connecting therewith through cable 82. RF signal generator 62 applies a signal to conditioning circuit 84. Conditioning circuit 84 preferably includes a signal conditioning resistor from which a conductivity signal is provided in a voltage divider fashion as is discussed hereinafter. An analog conductivity signal is also applied to acquisition circuit 72 where it is rapidly converted into digital conductivity signals for use with the permittivity information to provide a corrected flow volume output as discussed hereinafter.

The theory of operation for capacitance probe 10 is as follows. The voltages 68 and 70 out of detector 64 are a function of the phase angle and magnitude of the reflected signal "$S_{11}$" as modified by detector 64 function. However, the fill factor in the active region also becomes important in the volume measurement application of the present invention. The $S_{11}$ parameter is given by:

$$S_{11} = \left( \frac{Z_0 - Z_L}{Z_0 + Z_L} \right) \quad (1)$$

where $Z_o$ is the characteristic impedance of the transmission line 12 from the detector to the probe 10, and $Z_L$ is the probe input impedance given by $R+jX_C$ with R being resistance and $X_C$ being the reactance of the probe as exposed to fluid in probe housing 58. For a typical transmission cable 12, $Z_o=50.0+j0.0$ ohms. In general, $$Z_L = R + jX_C \quad (2)$$

where $X_C = 1/(2\pi f C_o \epsilon_r)$, with

R=the resistance of the probe, $X_C$=the reactance of the probe, f=the frequency of the signal, $C_o$=the air reactance of the probe, $\epsilon_r$=the relative dielectric constant of the fluid passing through the probe The phase angle and the magnitude of $S_{11}$ can be obtained by using Equation (2) in Equation (1) as $$\angle S_{11} = \tan^{-1} \left( \frac{100 X_C}{2500 - R - X_C^2} \right) \quad (3)$$

and $$|S_{11}| = (Re[S_{11}]^2 + Im[S_{11}]^2), \quad (4)$$

for a 50 ohm transmission line. For purely nonconductive fluids, the information of interest may essentially be the phase difference or angle of $S_{11}$. However, for the more general case that includes conductive fluids, such as salt water, the magnitude of $S_{11}$ is important.

The phase detector input from the probe is given by $$v_1 = v_{mag} \cos(\omega t + \theta) \quad (5)$$

where:

$V_{mag}$=the magnitude of input $v_1(t)$, and is proportional to the magnitude of $S_{11}$, $\omega = 2\pi f$, t=instantaneous time, and θ=the phase shift of the input signal.

The angle θ is the angle of $S_{11}$ plus or minus a constant caused by the length of the transmission line 12 between capacitance probe 10 and the phase detector 64. The reference signal input 84 that passes through the adjustable phase shifter 66 is given by $$v_2(t) = A \cos(\omega t + \phi) \quad (6)$$

where:

A=constant determined by the amplitude of the reference signal, and

φ=the phase adjustment of the adjustable phase shifter 66.
The output of the phase detector may be given by $$v_0 = v_1(t) v_2(t). \quad (7)$$

If all higher frequency terms are discarded, that is, filtered out, and only the dc terms are retained, and the output of the phase detector is given by $$v_0 = \frac{v_{amp} A}{2} \cos(\phi - \theta). \quad (8)$$

In one embodiment of the present invention, Equation (8) provides an end to end system response. The angle $<S_{11}$ from Equation (3) can be substituted for θ in Equation (8), and the magnitude $|S_{11}|$ from equation (4) can be substituted for $v_{amp}$.

The relative dielectric constant $\epsilon_r$ in equation (2) can be considered to be an "effective" value when the active region of capacitance probe 10 is partially filled. Unfortunately, different effective values for $\epsilon_r$ can be obtained with the same volume of fluid distributed differently in the active region of probe 10. To show this effect, a simplified model of capacitance probe 10 will be used based on rectangular plates as shown in FIG. 3. All materials/fluids are assumed to be low loss so that conductivities are ignored.

The total area of plate 90 is covered by covering 92 of low loss dielectric material $\epsilon_3$. Region 94 of plate 91 is covered by covering of loss dielectric material $\epsilon_2$. Plates 90 and 91 have an area A. Upper section 94 of plates 90 and 91 have an area $A_2$ and while lower section 96 of plates 90 and 91 have an area $A_1$. The upper section $A_2$ may be considered as three capacitors in series for that of fluid 98, air 100, and dielectric cover 102. The impedance for each in the upper section is given by:

$$\text{fluid} \quad Z_2 = \frac{d_2}{j\omega \epsilon_o A_2} \quad (9a)$$

$$\text{air} \quad Z_1 = \frac{d - d_2 - d_3}{j\omega \epsilon_o A_2} \quad (9b)$$

$$\text{dielectric cover} \quad Z_3 = \frac{d_3}{j\omega \epsilon_o \epsilon_3 A_2} \quad (9c)$$

The total impedance of upper area 94 "$Z_u$" is then given by the sum of 9a, 9b, and 9c:

$$Z_u = \frac{d}{j\omega \epsilon_o A_2} \left[ 1 - \frac{d_2}{d}\left(1 - \frac{1}{\epsilon_2}\right) - \frac{d_3}{d}\left(1 - \frac{1}{\epsilon_3}\right) \right] \quad (10)$$

Similarly, the total impedance of lower area 96 "$Z_L$" is given by:

$$Z_L = \frac{d}{j\omega \epsilon_o A_1} \left[ 1 - \frac{d_3}{d}\left(1 - \frac{1}{\epsilon_3}\right) \right] \quad (11)$$

Where:

A=area of either plate 91 or plate 90 d=plate separation $\epsilon_o$=free space permittivity

To obtain the total capacitance of capacitance probe 10, $Z_u$ can be inverted to obtain the admittance $Y_u$ and $Z_L$ inverted to obtain $Y_L$. Also the normalized distance d2/d will be called $G_2$ and d3/d will become $G_3$. Similarly, let $A_1/A$ be called $F_1$, and let $A_2/A$ be called $F_2$. The value of $G_3$ is fixed for any given probe.

If the probe is a parallel plate capacitor, Equation (2) can be written as:

$$Y_C = \frac{j\omega \epsilon_o \epsilon_r A}{d} \quad (12)$$

where $\epsilon_o$=permittivity of free space $\epsilon_r$=the "effective" relative dielectric constant of the capacitor Equating (12) with the inverse of (10) and (11):

$$\frac{j\omega \epsilon_o \epsilon_r A}{d} = \frac{j\omega \epsilon_o A}{d} \left[ \frac{F_2}{1 - G_2\left[1 - \frac{1}{\epsilon_2}\right] - G_3\left[1 - \frac{1}{\epsilon_3}\right]} \right] + \left[ \frac{1 - F_2}{1 - G_3\left[1 - \frac{1}{\epsilon_3}\right]} \right] \quad (13)$$

The right hand term provides the evaluation of the relative dielectric constant.

$$\epsilon_r = F_2 \left[ \frac{1}{K_1 - G_2\left[1 - \frac{1}{\epsilon_2}\right]} - \frac{1}{K_2} \right] + \frac{1}{K_1} \quad (14)$$

where $K_1 = 1 - G_3(1 - 1/\epsilon_3)$, which is fixed for any given probe. If $G_2$ and $\epsilon_2$ are held constant, $\epsilon_r$ is of the form:

$$\epsilon_r = K_2 F_2 + K_3 \quad (15)$$

This shows that the effective dielectric constant $\epsilon_r$ is linearly related to $F_2$ i.e. $\epsilon_r$ is linearly related to the "area factor" $F_2$.

If $F_2$ and $\epsilon_2$ are held constant, then $\epsilon_r$ is of the form:

$$\epsilon_r = K_4 \left[ \frac{K_5}{K_1 - G_2\left[1 - \frac{1}{\epsilon_2}\right]} \right] \quad (16)$$

In equations (14) and (15), $K_2$, $K_3$, $K_4$, and $K_5$ are constants that can be evaluated from equation (13). Equation (16) shows that $\epsilon_r$ is not a linear function of $G_2$, i.e. $\epsilon_r$ is not linear with respect to the "distance factor" $G_2$.

Equations (15) and (16) have strong implications on the design of the capacitance probe. If the probe is sufficiently narrow so that all fluid passing through touches both "plates" of the probe, then G2 is always equal to one. This removes the non-linearity in equation (16). Therefore, increases in fluid flow must be reflected in a larger $F_2$ which is linearly related to $\epsilon_r$. By also appropriately choosing values for $C_o$ and $\phi$ in equation (2) and $\phi$, in equation (6), then equation (8), the output voltage, can be made very nearly linear. This shows the active region of capacitance probe 10 must therefore be narrow.

Effectively, the width of the probe must be about equivalent to the smallest droplet of the fluid to be measured in the flow stream. This size will be dependent upon the flow stream velocity, temperature, and other factors. This size can generally be determined empirically for the particular conditions under which testing will take place. Generally, for flow measurement system 50, the most important factor is flow stream velocity which must not be so great that the urine effectively vaporizes. On the other hand, the flow stream velocity should be great enough to maintain a substantially constant flow and so that orifice 26 does not remain filled. The speed of the flow stream can be adjusted with flow control air holes 60 for this purpose. Directors 104 and reflectors 106, shown in FIG. 7, break up the flow of a urine stream so that it is combined with air flow for substantially constant flow through capacitance probe 10. For operation of the system, it is necessary to know the flow through capacitance probe 10, as may be provided with a flow meter, or to have either a constant flow or a constant flow profile. With a constant flow profile, the flow rate changes but changes consistently from sample to sample. The rate of flow of the flow stream could also be monitored as with a flow meter (not shown) as it exits orifice 26 that would essentially be responsive to rate of flow of the flow stream rather than the quantity of one fluid or phase in the multiphase flow stream. For other systems, factors such as temperature, pressure, the composition of the flow stream, the fluid to be measured and other factors may be important to determine the smallest droplet of the fluid for measurement.

Consider Equation (3) again. Assuming a 50 ohm transmission line, if $R^2+X_c^2<2500$, then the angle of $S_{11}$ moves abruptly from negative to positive. For a low loss fluid wherein $R^2$ is negligible, setting $X_c^2=2500$ yields $$f = \frac{1}{100\pi C_o \epsilon_r} \quad (17)$$

from the definition of $X_c$ above. Equation (17) provides the frequency at which the abrupt change in the angle of $S_{11}$ occurs. For example, if $C_o=1.0$ pf and $\epsilon=80$, then $f=39.78$ MHz. The use of this frequency could provide for an easy separation and identification of fluids having $\epsilon=79$ and $\epsilon=81$, for example. Thus, the present invention provides a technique whereby fluids having small differences in the real part of their complex permittivity, that is, the relative dielectric constant, can be separated by a careful choice of frequency. This approach can also be used to determine variations in a fluid from one sample to another. Conductivity probe 110 is shown in FIG. 4 as viewed from the top. A voltage is developed between center conductor 112 and metallic sample cylinder 114. That voltage will vary with the probe resistance or, in other words, as a function of the conductivity of fluid within metallic sample cylinder 114. Metallic sample cylinder 114 is filled via aperture 116 and is drained via drip hole 118. In a presently preferred embodiment, the length 120 of center conductor 112 is approximately ¼ inch and length 122 of metallic sample cylinder 114 is approximately ⅜ inch. Conductivity probe 110 is mounted within probe housing 58 in the flowline after capacitance probe 10. A conditioner or load resistor, that may conveniently be positioned within conditioner circuit 84, is preferably used in series probe resistance on a voltage divider principle such that:

$$\frac{V_L}{V_s} = \frac{R_L}{R_L + R_p} \quad (18)$$

Where:

$V_L$=voltage across the load resistor $V_s$=RF source voltage $R_L$=load resistor (in conditioner circuit 84)

$R_p$=probe resistance

In the presently preferred embodiment, $R_L$ is chosen typically at 50 ohms. The probe resistance is given by $$R_p = \frac{d}{\sigma A} \quad (19)$$

Where:

d=spacing between the plates of the probe

A=area of the smaller plate

σ=conductivity of the liquid being measured.

The conductivity probe resistance $R_p$, can vary considerably and is frequency dependent. Generally, this resistance falls between 1 ohm and 5000 ohms at about 50 MHz. The voltage $V_L$ is detected and conditioned to provide an analog direct current value of 0 to 5 volts or 0 to 10 volts for input to an A/D board within acquisition circuit 72 whereupon the data can be stored in storage 76. This voltage is used as a correction factor for the fluid flow volume.

The following equations are limited to specific capacitance and conductivity probe design in accordance with the present invention and are based upon data obtained during approximately 20 successive tests with that system. Each separate system should be checked empirically to obtain the equations relating thereto. Thus, it is possible to relate flow volume Z to probe capacitance and conductivity as follows:

$$Z=Y2-X1(Y1-C)^2-X2(Y1-C)^3-X3(Y1-C)^4-X4(Y1-C)^5-X5(Y1-C)^6$$

where Y2 is an equation derived from the results of successive substantially identical tests of the capacitance probe. From these empirical tests, results for specific capacitance probe design in accordance with the present invention were found such that:

$$Y2=129.02-17.924x+54.943x^2-30.406^3 \quad (21)$$

where x represents the percentage salt. Y1 is the equation derived from the conductance probe results for the specific conductance probe in accord with the present invention.

$$Y1=0.222+5.5707x-3.2377x^2+0.6394^3 \quad (22)$$

where x represents the percent salt. C is a constant=0.222. X1, X2, X3, X4 and X5 are unknown constants determined by substituting the measured results from both the capacitance and conductance probe into equation (22) using five different values for salt content. This provides five equations and five unknowns.

FIG. 7 schematically discloses the arrangement of capacitance probe 10 and conductance probe 110 within probe housing 58. Thus, flow stream 54, that in the present embodiment includes a urine sample mixed with air in a micro-gravity environment, enters probe housing 58 and engages deflector 106. Subsequently, director 104 is engaged and directs the flow stream through aperture 26 of capacitance probe 10. The flow stream continues and fills conductance probe 110 to obtain a conductance samples during testing.

Figure 5:
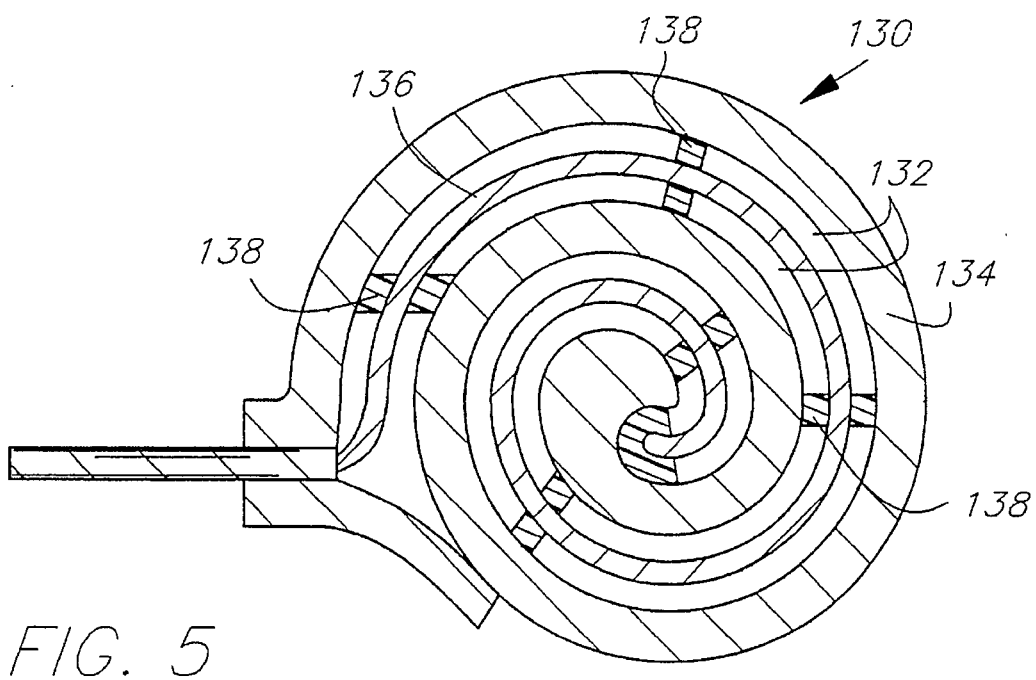
FIG. 5 is a top view, in cross-section, of a spiral capacitance probe in accord with the present invention.
Figure 6:
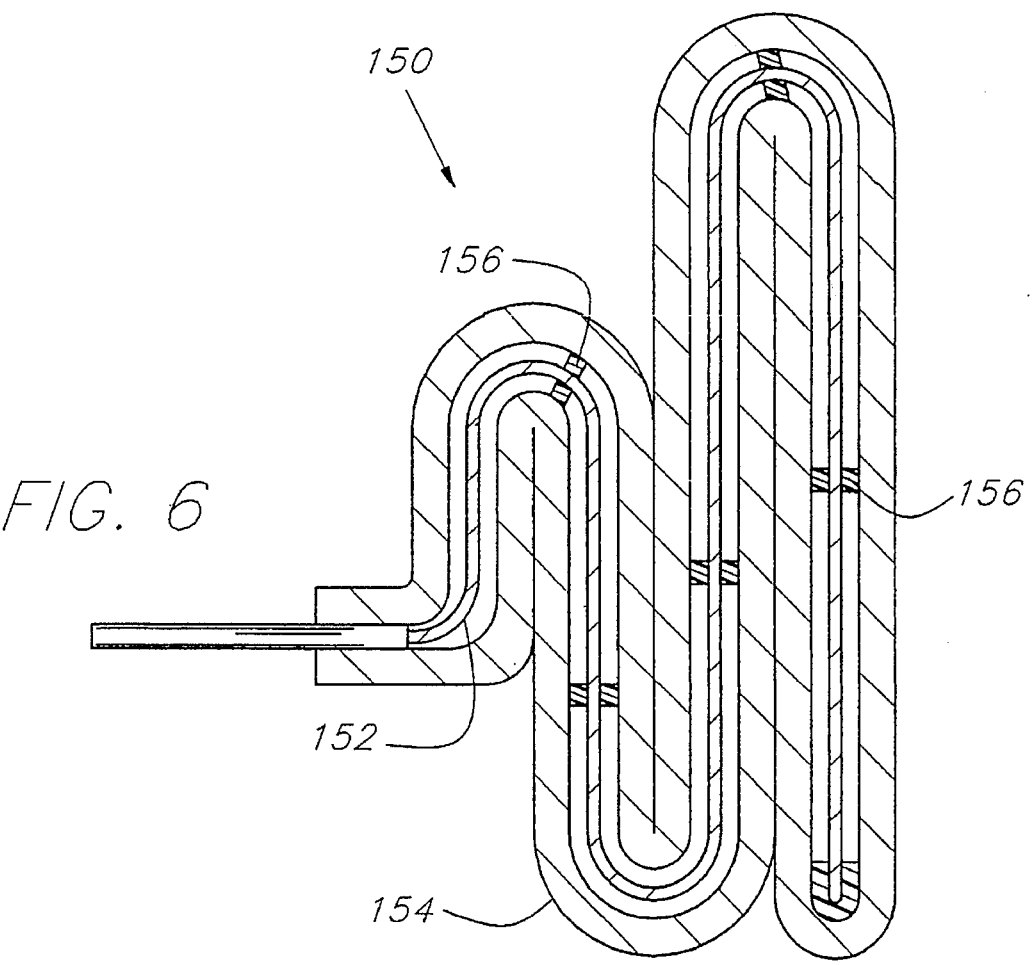
FIG. 6 is a top view, in cross-section, of a serpentine capacitance probe in accord with the present invention.

FIGS. 5 and 6 disclose other embodiments of the present invention whereby the flow rate can be significantly increased. The design of capacitance probe 10 as shown in FIG. 1 is for fairly slow flow rates. Thus, the active region of the probe 130 as shown in FIG. 5 is increased significantly while maintaining a narrow probe aperture 132 on either side of center conductor 136. Metallic supports 134 preferably provide a ground plane as well as act to keep probe 130 in a rigid position. Center conductor 136 is held in position with dielectric separators 138 as necessary for sufficient support. The only limit in lengthening of this type being the point at which the length of the active region becomes a significant part of the wavelength and begins to radiate as an antenna. This can generally be avoided by lowering the operating frequency. Two or more probes can be used to provide additional flow information. Upstream and downstream probes can be used to determine flow velocity. In FIG. 6, a serpentine shape probe 150 is disclosed that shows the shape of the probe can be varied significantly as desired, if necessary. Serpentive probe 150 includes center conductor 152, metallic supports 154 and dielectric separator 156.

The present invention thus provides a technique for detecting and monitoring fluids, such as a fluid within a flow stream, with a lighter, smaller, unit that uses less electricity. The present invention is directly adapted to monitoring the flow of droplets through an air flow in a gravity system as may be desired to determine rainfall rates in a moving vehicle, for wind tunnel measurements, for some types of fuel flow systems, and the like. The principles disclosed in the preferred embodiment disclosed may be used for determining the amount of a material in solution such as salt in water, distinguishing and/or monitoring fluid mixtures of fluids having relative permeabilities that are very close such as two alcohols or two oils, determining volume fractions of substantially immiscible fluids such as of oil and water in a flowline, detecting impurities in water, and the like.

The foregoing disclosure and description of the invention is illustrative and explanatory thereof, and various changes in the method steps as well as the details of the apparatus may be made within the scope of the appended claims without departing from the spirit of the invention.

What is claimed is:

1. An electromagnetic flow monitor for monitoring flow of a material within a flow stream, comprising:

first probe, said first probe having first and second elongate electrodes substantially parallel with respect to each other, said first and second elongate electrodes having a spacing therebetween that is functionally related to said fluid to be monitored, said first and second elongate electrodes defining a flow aperture;

a signal generator operative to produce a reference signal for said probe;

a cable for applying said reference signal to said probe and for receiving a reflected signal therefrom;

flow rate means for providing said flow stream at a known flow rate through said flow aperture;

a flow director for directing said flow stream between said first and second elongate electrodes; and detection circuits responsive to a permittivity of said material within said flow stream between said first and second elongate electrodes.

2. The electromagnetic flow monitor of claim 1, wherein said flow rate means comprises a vacuum source to provide said flow stream as a flow stream of gas containing said material therein.

3. The electromagnetic flow monitor of claim 1, further comprising:

a second probe, said second probe being responsive to a conductivity of said material.

4. The electromagnetic flow monitor of claim 3, further comprising:

a conditioning circuit in series with said second probe, said second probe having a load resistance that varies with said conductivity of said material, said conditioning circuit being operative to provide a voltage proportional to said load resistance.

5. An electromagnetic flow monitor for monitoring flow of a material within a flow stream, comprising:

a first probe, said first probe having at least two electrodes, said at least two electrodes having a substantially constant spacing there between;

a second probe, said second probe having first and second electrodes;

a cable for receiving a reflected signal from said first probe;

detection circuitry responsive to said reflected signal from said first probe indicative of a permittivity of said flow stream between said first and second electrodes for producing an analog permittivity signal, said detection circuitry being responsive to a conductivity of said material for producing an analog conductivity signal;

analog to digital conversion circuitry for converting said analog permittivity signal and said analog conductivity signal, respectively, to a digital permittivity signal and a digital conductivity signal; and calculating circuitry for combining said digital permittivity signal and said digital conductivity signal to provide an output related to flow of said material within said flow stream.

6. The electromagnetic flow monitor of claim 5, wherein:

said first electrode of said first probe has a length dimension greater than a width or height dimension, said first electrode being oriented such that said length dimension is substantially perpendicular to a flow direction of said flow stream.

7. The electromagnetic flow monitor of claim 5, wherein:

said first electrode of said first probe has a length dimension greater than a width or height dimension, said first electrode of said first probe having a cross-sectional profile such that said length dimension is substantially curved.

8. The electromagnetic flow monitor of claim 7, wherein:

said first electrode of said first probe has a cross-sectional profile such that said length dimension of said first electrode is substantially spiral.

9. The electromagnetic flow monitor of claim 7, wherein:

said first electrode of said first probe having a cross-sectional profile such that said length dimension of said first electrode is substantially serpentine.

10. The electromagnetic flow monitor of claim 7, further comprising:

a plurality of insulated supports between said first and second electrodes along said length dimension of said first and second electrodes.

11. The electromagnetic flow monitor of claim 5, wherein:

said calculating circuitry for combining said digital permittivity signal and said digital conductivity signal is operable to provide an output related to a volume of said material that flows within said flow stream during a sample period.

12. A method for monitoring flow of a material within a flow stream, comprising the steps of:

forming an aperture by providing at least two electrodes to be substantially parallel with respect to each other;

directing all flow of said flow stream through said aperture;

determining a rate of flow of said flow stream containing said material through said aperture;

providing a spacing between said two elongate electrodes functionally related to the size of droplet of said material to be monitored within said flow stream;

applying a radio reference signal to said at least two electrodes;

obtaining a reflected signal from said at least two electrodes that is indicative of a permittivity of said flow stream between said first and second electrodes;

providing a second probe, said second probe being responsive to a conductivity of said material; and obtaining a flow rate of said material through said aperture corrected for said conductivity of said material.

13. The method of claim 12, further comprising:

providing a cylindrical collection chamber for said conductivity probe.

* * * * *